(12) United States Patent
Putyera et al.

(10) Patent No.: US 6,225,257 B1
(45) Date of Patent: *May 1, 2001

(54) POST-CARBONIZATION TREATMENT OF MICROPOROUS CARBONS FOR ENHANCEMENT OF METHANE AND NATURAL GAS STORAGE PROPERTIES

(75) Inventors: Karol Putyera, Syracuse, NY (US); Cristian I. Contescu, Redondo Beach, CA (US); Kwabena A. G. Amankwah, Syracuse; Wayne S. Amato, Tully, both of NY (US)

(73) Assignee: Niagara Mohawk Power Corporation, Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/395,578

(22) Filed: Sep. 14, 1999

(51) Int. Cl.[7] .................................................. B01J 20/20
(52) U.S. Cl. ......................................... 502/432; 423/460
(58) Field of Search .................................. 502/432, 420; 423/460

(56) References Cited

U.S. PATENT DOCUMENTS

| | | | |
|---|---|---|---|
| 4,205,055 | 5/1980 | Maire et al. | 423/445 |
| 4,371,454 | 2/1983 | Hisatsugu et al. | 252/422 |
| 4,499,208 | 2/1985 | Fuderer | 502/415 |
| 4,699,896 * | 10/1987 | Sihg et al. | 502/423 |
| 4,716,736 | 1/1988 | Schwarz | 62/48 |
| 4,857,243 | 8/1989 | Von Blucher et al. | 264/13 |
| 4,921,826 | 5/1990 | Juntge et al. | 502/180 |
| 4,960,450 | 10/1990 | Schwarz et al. | 62/18 |
| 4,978,649 | 12/1990 | Surovikin et al. | 502/416 |
| 5,064,805 | 11/1991 | Otowa | 502/427 |
| 5,071,820 | 12/1991 | Quinn et al. | 502/434 |
| 5,242,879 | 9/1993 | Abe et al. | 502/180 |
| 5,360,461 | 11/1994 | Meinzer | 48/61 |
| 5,372,619 | 12/1994 | Greinke et al. | 4/127.3 |
| 5,385,876 | 1/1995 | Schwarz et al. | 502/80 |
| 5,464,605 | 11/1995 | Hayden | 423/579 |
| 5,614,460 | 3/1997 | Schwarz et al. | 502/418 |
| 5,626,637 | 5/1997 | Baker | 48/127.3 |
| 5,653,951 | 8/1997 | Rodriguez et al. | 423/439 |
| 5,837,741 | 11/1998 | Schwarz et al. | 521/124 |

* cited by examiner

*Primary Examiner*—Stuart L. Hendrickson
(74) *Attorney, Agent, or Firm*—Brown, Pinnisi & Michaels, P.C.

(57) ABSTRACT

Microporous carbonaceous materials, useful in the storage of gaseous fuels such as methane and natural gas, are improved through modification of their microporous structure in a post-carbonization process. This modification is done by heat treatment in an oxidizing atmosphere containing carbon dioxide with or without other diluting gases such as nitrogen, argon or water-vapor. The post-carbonization process involved modifying a starting microporous carbon with heat treatment in which the carbon is contacted with a carbon dioxide-containing atmosphere. This new treatment can be favorably applied either to selected and commercially available activated microporous carbons which have been designed for applications other than fuel gas storage or to synthetic microporous carbons proposed for storage of light gases.

6 Claims, 1 Drawing Sheet

POST-CARBONIZATION TREATMENT OF MICROPOROUS CARBONS FOR ENHANCEMENT OF METHANE AND NATURAL GAS STORAGE PROPERTIES

FIELD OF THE INVENTION

The invention pertains to the field of storage media for methane and natural gas. More particularly, the invention pertains to a method of enhancing a microporous carbon adsorbent to improve its natural gas storage capability.

BACKGROUND OF THE INVENTION

It is known that the density of gaseous methane can be enhanced in a storage vessel with the use of a carbonaceous adsorbent material having pores in a specified and limited range of diameters. In addition, activated carbons with a good microporous structure, but undesired microstructure, show lower working capacity. Therefore, there is always a compromise between the microporosity of the adsorbent where the enhancement effect takes place and the bulk density of the adsorbent, which determines the filling capacity of the storage system. Thus, the essential and principal feature of this invention is to provide post-carbonization treatment procedures which are applied to existing and preselected microporous carbons, which as a result of these treatments, then exhibit increased enhancement properties as storage media for methane and natural gas.

U.S. Pat. No. 5,071,820 (Quinn) entitled CARBONACEOUS MATERIAL WITH HIGH MICROPORE AND LOW MACROPORE VOLUME AND PROCESS FOR PRODUCING SAME discloses a two-step procedure for making activated carbon that involves heating the carbon to 150–200° C. in oxygen for 45–75 minutes, after which the oxygen is purged with nitrogen, and then the carbon is heated to 750–900° C. in nitrogen for 15–45 minutes. The process can be repeated depending on the extent of microporosity desired.

U.S. Pat. No. 5,614,460 (Schwarz) entitled MICROPOROUS CARBONS FOR FUEL GAS STORAGE discloses a method for making activated carbon, known as CNDS synthetic activated carbon, by using crystalline salts of aromatic sulfonates as precursors.

U.S. Pat. No. 5,385,876 (Schwarz) entitled ACTIVATED CARBONS MOLECULARLY ENGINEERED discloses a method for making microporous carbon adsorbent material using an inorganic matrix and active carbon supported within the matrix.

U.S. Pat. No. 5,372,619 (Greinke) entitled METHOD FOR STORING METHANE USING A HALOGENATING AGENT TREATED ACTIVATED CARBON discloses a method for making a halogenated or sulfonated active carbon which has a high storage capacity for methane.

U.S. Pat. No. 4,499,208 (Fuderer) entitled ACTIVATED CARBON ADSORBENT WITH INCREASED HEAT CAPACITY AND THE PRODUCTION THEREOF discloses a method for increasing the heat capacity of activated carbon by adding dense alumina and heating at an elevated temperature U.S. Pat. No. 4,960,450 (Schwarz) entitled SELECTION AND PREPARATION OF ACTIVATED CARBON FOR FUEL GAS STORAGE discloses a method for making an activated carbon for enhanced sorption of hydrogen by washing the carbon in water or acid and then oxidizing the washed carbon in a stream of oxygen and inert gas at an elevated temperature.

U.S. Pat. No. 4,716,736 (Schwarz) entitled METAL ASSISTED CARBON COLD STORAGE OF HYDROGEN discloses a method for storing hydrogen by using a transition metal dispersed in activated carbon.

U.S. Pat. No. 5,360,461 (Meinzer) entitled POLYMERIC STORAGE BED FOR HYDROGEN discloses a hydrogen storage device using polymeric material and a metal hydride.

U.S. Pat. No. 5,626,637 (Baker) entitled LOW PRESSURE METHANE STORAGE WITH HIGHLY MICROPOROUS CARBONS discloses a method for storing hydrocarbon fuels by making chemically and thermally treating an activated carbon using potassium hydroxide.

U.S. Pat. No. 5,653,951 (Rodriguez) entitled STORAGE OF HYDROGEN IN LAYERED NANOSTRUCTURES discloses a composition comprising a solid layered nanostructure, preferably carbon, for storage of hydrogen.

U.S. Pat. No. 4,857,243 (Von Blucher) entitled PROCESS OF MAKING MICROSPHERULES OF ACTIVATED CARBON discloses a method of making activated carbon microspherules by kneading activated carbon particles of a size below 100 μm together with a dispersion of a water-insoluble synthetic resin, pressing the mixture through a screen with a mesh size related to the size of the desired product, powdering the pressed material, and granulating and drying the resulting microspherules.

U.S. Pat. No. 4,921,826 (Juntgen) entitled PROCESS FOR PRODUCING AN ACTIVE CARBON CATALYST discloses a process for producing an active carbon catalyst by ammonia treatment of active carbons at a temperature above 350° C. in an inert-gas stream until no $SO_2$ development occurs.

U.S. Pat. No. 4,371,454 (Hisatsugu) entitled PROCESS FOR PREPARING SPHERICAL CARBON MATERIAL AND SPHERICAL ACTIVATED CARBON discloses a process for preparing spherical activated carbon from an admixture of pitch, amorphous carbon, and a viscosity-controlling agent.

U.S. Pat. No. 4,205,055 (Maire) entitled DUAL PORE-STRUCTURE ARTIFICIAL CARBON AND GRAPHITE discloses a process for making the material and the material itself which is an artificial dual pore-structured carbon suitable for use as a catalyst substrate or an electrode material consisting essentially of a macroporous agglomeration of strongly bonded microporous grains of carbon.

U.S. Pat. No. 5,242,879 (Abe) entitled ACTIVE CARBON MATERIALS, PROCESS FOR THE PREPARATION THEREOF AND THE USE THEREOF discloses an activated carbon tailored for decomposition of hydrogen peroxide, hydrazines, and other water pollutants having an average pore radius between 15 and 30 Å.

U.S. Pat. No. 5,464,605 (Hayden) entitled PROCESS FOR THE DECOMPOSITION AND REMOVAL OF PEROXIDES discloses a process for decomposition and removal of peroxides from a gaseous or liquid media by contacting the media with a carbonaceous char which is made by carbonizing a bituminous coal at temperatures below 700° C. in the presence of an oxidant gas, oxidizing the coal at temperatures below 700° C. during or after the carbonization, and contacting the carbonized coal with a nitrogen compound and raising the temperature above 700° C. The resulting material is then activated to the desired density at temperatures above 700° C. in steam and/or carbon dioxide.

U.S. Pat. No. 5,064,805 (Otowa) entitled PRODUCTION OF HIGH QUALITY CARBON discloses a high quality activated carbon produced by starting with coconut shell char and activating with potassium hydroxide.

U.S. Pat. No. 4,978,649 (Surovikin) entitled POROUS CARBONACEOUS MATERIAL discloses an activated carbon produced by a process that increases the proportion of pores with a size greater than 200 Å.

U.S. Pat. No. 5,837,741 (Schwarz) entitled COMPOSITE MICROPOROUS CARBONS FOR FUEL GAS STORAGE discloses a method of making a microporous carbon material from a precursor which is either a crystalline salt of an aromatic sulfonate or a nonporous polymeric salt.

SUMMARY OF THE INVENTION

Briefly stated, microporous carbonaceous materials, useful in the storage of gaseous fuels such as methane and natural gas. are improved through modification of their microporous structure in a post-carbonization process. This modification is done by heat treatment in an oxidizing atmosphere containing carbon dioxide with or without other diluting gases such as nitrogen, argon or water-vapor. The post-carbonization process involved modifying a starting microporous carbon with heat treatment in which the carbon is contacted with a carbon dioxide-containing atmosphere. This new treatment can be favorably applied either to selected and commercially available activated microporous carbons which have been designed for applications other than fuel gas storage or to synthetic microporous carbons proposed for storage of light gases.

According to an embodiment of the invention, a method for post-carbonization treatment of microporous carbons includes the steps of: (a) providing a specified amount of at least one microporous carbon at room temperature; (b) raising a temperature of said carbon at 10 degrees Celsius per minute from room temperature to approximately 850 degrees Celsius in a first controlled atmosphere; (c) holding said temperature of said carbon at approximately 850 degrees Celsius for a specified period of time in a second controlled atmosphere; and (d) cooling said temperature of said carbon from approximately 850 degrees Celsius to room temperature in a third controlled atmosphere.

DESCRIPTION OF THE PREFERRED EMBODIMENT

Figure 1:
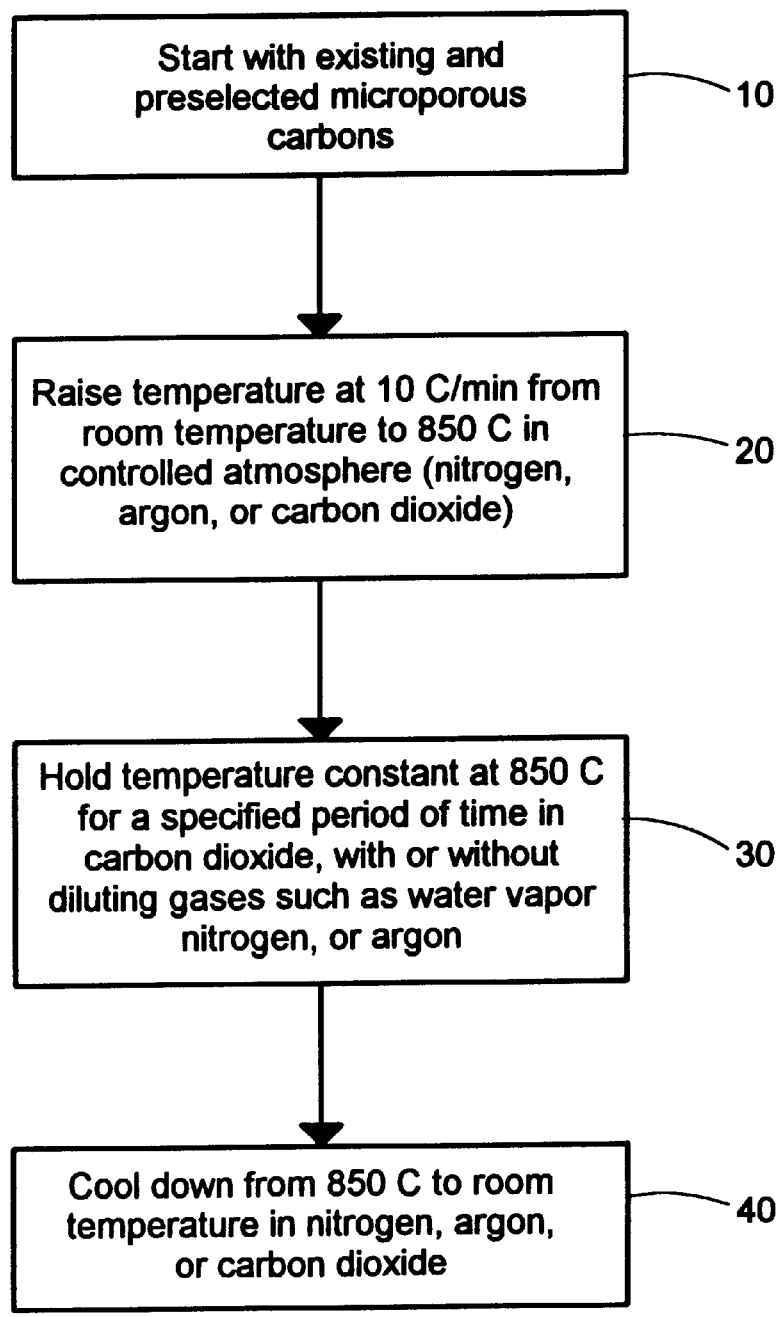
FIG. 1 shows a flow chart of the process of the present invention.

The experimental data in this invention are based on measurements of deliverable capacity of methane or natural gas stored by the carbon-based adsorbents using a high-pressure volumetric equipment in which the volume of the storage vessel that contained the carbon adsorbent is at least 145 $cm^3$ and weights ranging from 60 to 70 grams depending on bulk density. Volumes of gases delivered are measured during the discharge cycle. For comparison purposes the following working conditions are selected as a standard: charging up to 35 atm (500 psig), discharging down to about 1 atm with a working temperature between 20 and 35 ° C. All results for storage capacity are reported as deliverable V/V values (volume of delivered gas between the maximum charging pressure and about 1 atm divided by the volume of the storage vessel).

The selected physical properties of all carbon adsorbents are characterized using adsorption of nitrogen at liquid nitrogen temperature carried out in a NOVA 1200 sorption analyzer (Quantachrome). Before measurements, the carbon adsorbents are conditioned by heating at 200 ° C. for 15 h in a vacuum of $10^{-4}$ Torr.

The packed bulk density of all carbon adsorbents is measured using the Autotap instrument (Quantachrome) according to the following procedure: an amount of carbon sample sufficient to fill a graduated cylinder of 50 $cm^3$ is weighed and its initial volume is measured with an accuracy of ±0.5 $cm^3$. Then the graduated cylinder containing carbon is placed in the Autotap instrument and the contents are allowed to pack under the action of vertical strokes applied by the instrument. The volume of packed material is read after 2000, 4000, and 5000 strokes have been applied. The packed bulk density is calculated as the ratio between the mass of the material and its packed volume measured in the graduated cylinder after 5000 strokes. The same method is used for filling the storage vessel with carbon adsorbent before the measurement of the storage capacity. The agreement between the values of bulk packed density measured in the graduated cylinder and in the real storage vessel is within a ±0.05 $cm^3/g$ limit.

Referring to FIG. 1, a General Block Flow Diagram for the new treatment process is shown, where the possible variations in terms of regime and gas types are easily seen. In step 10, existing and preselected microporous carbons are provided. Then, in step 20, the temperature of the carbons is raised at a rate of 10° C./min to approximately 850° C. in a controlled atmosphere containing one of nitrogen, argon, or carbon dioxide. In step 30, the temperature is held constant at approximately 850° C. for a specified period of time in carbon dioxide, either with or without diluting gases such as water vapor, nitrogen, or argon, preferably between 2 to 5 hours in a carbon dioxide only environment. Finally, in step 40, the carbon is cooled to room temperature in nitrogen, argon, or carbon dioxide. The highest V/V has been obtained using carbon dioxide in the cooling stage.

EXAMPLE 1

A carbon sample is prepared by modifying a commercial carbon, Nusorb (Nucon Industries, Inc.), which is originally obtained from coconut shell using steam activation. This commercial carbon, designed for applications other than storage of fuel gases, is heat treated according to the present invention in such a way that its microporous structure becomes suitable for the storage of fuel gases such as methane and natural gas. The heat treatment is composed of three regimes for which the flowing gas environments may vary. The first temperature regime consists of a temperature rise from room temperature to 850° C. at a rate of 10° C./minute. This temperature of 850° C. is kept constant for varying amounts of time during the second temperature regime. The third temperature regime allows the system to cool down from 850° C. to room temperature. Sample sizes ranged from 100 to 120 grams depending on the bulk density.

In the present example, Nusorb carbon is subjected to the above-mentioned heat treatment in the following gas environments and a dwell time of 2 hours for the second temperature regime. Gas flow rate is 10 ml/min in all cases. Nitrogen gas is used in the first regime, carbon dioxide is used in the second regime, while nitrogen gas is used again in the third regime. This modified carbon is labeled Nusorb-A1. The untreated Nusorb has a V/V of 85, whereas Nusorb-A1 has a V/V of 89, a 4.7% increase.

EXAMPLE 2

In this example, the commercial carbon, Nusorb, is heat treated in the same manner as Example 1, but with one variation. The dwell time for the second temperature regime is 5 hours. This modified carbon is labeled Nusorb-A3 and has a V/V of 94, a 10.6% increase.

EXAMPLE 3

The third example is similar to Example 2 with the following variation: The flowing gas environment during the third temperature regime is carbon dioxide instead of nitrogen. This modified carbon is labeled Nusorb-A14 and has a V/V of 102, a 20% increase.

EXAMPLE 4

This example is similar to Example 3, with the following variation: the flowing gas environment during the first temperature regime was argon instead of nitrogen. This modified carbon is labeled Nusorb-A16 and has a V/V of 94, a 10.6% increase.

EXAMPLE 5

This example is similar to Example 3, with the following modification: the flowing gas environment during the first temperature regime was a mixture of water vapor and carbon dioxide, realized by passing a flow of carbon dioxide through a water-containing container. This modified carbon is labeled Nusorb-A18 and has a V/V of 96, a 12.9% increase.

The structural and storage properties of these modified carbons, as well as the as-received commercial carbon, Nusorb, are listed in Table 1. The details of how the measurements are obtained are as described earlier.

TABLE 1

Properties of Nusorb before and after post-carbonization treatment

| Sample | Specific Surface Area ($m^2/g$) | Total pore volume ($cm^3/g$) | Micropore volume ($cm^3/g$) | Bulk density ($g/cm^3$) | V/V Methane |
|---|---|---|---|---|---|
| Nusorb | 1198 | 0.53 | 0.47 | 0.48 | 85 |
| Nusorb-A1 | 1295 | 0.58 | 0.51 | 0.46 | 89 |
| Nusorb-A3 | 1308 | 0.59 | 0.51 | 0.43 | 94 |
| Nusorb-A14 | 1486 | 0.69 | 0.58 | 0.41 | 102 |
| Nusorb-A16 | 1354 | 0.63 | 0.52 | 0.42 | 94 |
| Nusorb-A18 | 1322 | 0.59 | 0.51 | 0.42 | 96 |

EXAMPLE 6

In this example, another type of carbonaceous material, CNDS, a synthetic microporous carbon, is obtained via the pyrolysis of the disodium-salt of naphthalene 1,5-disulfonic acid. The process for obtaining this base carbon (CNDS) is described in U.S. Pat. 5,614,460. The heat treatment applied to the CNDS carbon in this example is similar to that of Example 1, but with the following variation. The dwell time for the second temperature regime is 4 hours. This modified sample is labeled CNDS-A3. The untreated CNDS has a V/V of 70, whereas CNDS-A3 has a V/V of 80, an increase of 14.3%.

EXAMPLE 7

In this example, the CNDS-A3 modified sample is again subjected to the heat treatment conditions of Example 1. This modified version is labeled CNDS-A3/2 and has a V/V of 91, an increase of 30%.

Table 2 shows a summary of the structural and storage properties of the base carbon CNDS and its modified counterparts. The details of how the measurements are obtained are described earlier.

TABLE 2

Properties of CNDS after post-carbonization treatments

| Sample | Specific Surface Area ($m^2/g$) | Total pore volume ($cm^3/g$) | Micropore volume ($cm^3/g$) | Bulk density ($g/cm^3$) | V/V Methane |
|---|---|---|---|---|---|
| CNDS | 595 | 0.41 | 0.22 | 0.49 | 70 |
| CNDS-A3 | 1104 | 0.70 | 0.40 | 0.46 | 80 |
| CNDS-A3/2 | 1220 | 0.74 | 0.46 | 0.44 | 91 |

Tables 1 and 2 show that the post-carbonization treatments applied to the commercially available Nusorb and the synthetic microporous carbon CNDS result in significant improvements in the structural properties of these carbons. More importantly, however, are the increases achieved in the deliverable amounts of methane for these carbons at a pressure of approximately 500 psig. There are 20% and 30% increases in the storage capacities for Nusorb and CNDS, respectively, as a result of the post-carbonization treatments.

EXAMPLE 8

In this example, a different type of granulated commercial carbon, Calgon CAL 12×40, was subjected to the treatment of Example 3. This modified carbon was labeled Calgon-A1. The untreated Calgon CAL has a V/V of 89, while the Calgon-A1 has a V/V of 90, an increase of only 1.1%.

EXAMPLE 9

In this example, another type of powdered commercial carbon, Calgon WPH, was treated as described in Example 3. This modified carbon was labeled Calgon-WPH-A1. The untreated Calgon WPH has a V/V of 83, while the Calgon WPH-A1 has a V/V of 98, an increase of 18%.

EXAMPLE 10

In this example, another type of powdered commercial carbon, Westvaco SN20, was treated as described in Example 3. This modified carbon was labeled Westvaco SN20-A1. The untreated Westvaco SN20 has a V/V of 87, while the Westvaco SN20-A1 has a V/V of 96, an increase of 10.3%.

Table 3 shows a summary of the structural and storage properties of three base carbons and their modified counterparts. The details of how the measurements are obtained are described earlier.

Properties of Several Commercial Carbons Before and After Post-Carbonization Treatment

TABLE 3

Properties of several commercial carbons before and after post-carbonization treatment

| Sample | Specific Surface Area ($m^2/g$) | Total pore volume ($cm^3/g$) | Micropore volume ($cm^3/g$) | Bulk density ($g/cm^3$) | V/V Methane at 500 psig |
|---|---|---|---|---|---|
| Calgon CAL (as received) | 1045 | 0.54 | 0.44 | 0.53 | 89 |
| Calgon-CAL-A1 | 1105 | 0.59 | 0.43 | 0.46 | 90 |
| Calgon WPH (as received) | 918 | 0.47 | 0.37 | 0.60 | 83 |
| Calgon WPH-A1 | 1071 | 0.55 | 0.44 | 0.56 | 98 |

TABLE 3-continued

Properties of several commercial carbons before and after post-carbonization treatment

| Sample | Specific Surface Area (m$^2$/g) | Total pore volume (cm$^3$/g) | Micropore volume (cm$^3$/g) | Bulk density (g/cm$^3$) | V/V Methane at 500 psig |
|---|---|---|---|---|---|
| Westvaco SN20 (as received) | 1480 | 1.22 | 0.63 | 0.36 | 87 |
| Westvaco SN20-A1 | 1830 | 1.36 | 0.88 | 0.35 | 96 |

The treatment of the present invention increases the V/V of an activated carbon no matter what the original activation treatment was. For instance, Nusorb is steam activated while CNDS is chemically activated.

Table 4 is a consolidation of Tables 1, 2, and 3 of the structural and storage properties of all base carbons and their modified counterparts.

TABLE 4

Properties of all tested carbons before and after post-carbonization treatment

| Sample | Specific Surface (m$^2$/g) | Total pore volume (cm$^3$/g) | Micropore volume (cm$^3$/g) | Bulk density (g/cm$^3$) | V/V Methane |
|---|---|---|---|---|---|
| Nusorb | 1198 | 0.53 | 0.47 | 0.48 | 85 |
| Nusorb-A1 | 1295 | 0.58 | 0.51 | 0.46 | 89 |
| Nusorb-A3 | 1308 | 0.59 | 0.51 | 0.43 | 94 |
| Nusorb-A14 | 1486 | 0.69 | 0.58 | 0.41 | 102 |
| Nusorb-A16 | 1354 | 0.63 | 0.52 | 0.42 | 94 |
| Nusorb-A18 | 1322 | 0.59 | 0.51 | 0.42 | 96 |
| CNDS | 595 | 0.41 | 0.22 | 0.49 | 70 |
| CNDS-A3 | 1104 | 0.70 | 0.40 | 0.46 | 80 |
| CNDS-A3/2 | 1220 | 0.74 | 0.46 | 0.44 | 91 |
| Calgon CAL (as received) | 1045 | 0.54 | 0.44 | 0.53 | 89 |
| Calgon-CAL-A1 | 1105 | 0.59 | 0.43 | 0.46 | 90 |
| Calgon WPH (as received) | 918 | 0.47 | 0.37 | 0.60 | 83 |
| Calgon WPH-A1 | 1071 | 0.55 | 0.44 | 0.56 | 98 |
| Westvaco SN20 (as received) | 1480 | 1.22 | 0.63 | 0.36 | 87 |
| Westvaco SN20-A1 | 1830 | 1.36 | 0.88 | 0.35 | 96 |

Examining Tables 1–4 leads to some interesting observations. For each group consisting of the same type of carbon, the sample with the highest V/V also has the highest specific surface, the largest total pore volume, the largest micropore volume, and the lowest bulk density. For example, all the carbons in Table 1 are in the Nusorb group. The sample designated Nusorb-A14 has the highest V/V as well as the highest specific surface, the largest total pore volume, the largest micropore volume, and the lowest bulk density. In Table 2, the carbons are in the CNDS group, with CNDS-A3/2 having the highest V/V as well as the highest specific surface, the largest total pore volume, the largest micropore volume, and the lowest bulk density. Table 3 contains three different groups, and the same relationship holds true for the modified carbon compared to the unmodified carbon.

Yet, the same relationship does not hold true when the carbons with the highest V/V in each group are compared to one another as shown in Table 5.

TABLE 5

Properties of the tested carbons from each group with the highest V/V

| Sample | Specific Surface (m$^2$/g) | Total pore volume (cm$^3$/g) | Micropore volume (cm$^3$/g) | Bulk density (g/cm$^3$) | V/V Methane |
|---|---|---|---|---|---|
| Nusorb-A14 | 1486 | 0.69 | 0.58 | 0.41 | 102 |
| CNDS-A3/2 | 1220 | 0.74 | 0.46 | 0.44 | 91 |
| Calgon-CAL-A1 | 1105 | 0.59 | 0.43 | 0.46 | 90 |
| Calgon WPH-A1 | 1071 | 0.55 | 0.44 | 0.56 | 98 |
| Westvaco SN20-A1 | 1830 | 1.36 | 0.88 | 0.35 | 96 |

The Nusorb-A14 has the highest V/V, but the Westvaco SN20-A1 has a higher specific surface, both the CNDS-A3/2 and the Westvaco SN20-A1 have higher total pore volumes, the Westvaco SN20-A1 has a higher micropore volume, and the Westvaco SN20-A1 has a lower bulk density. Therefore, the properties of the treated carbons are not necessarily indicative of the V/V of the treated carbons.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method for post-carbonization treatment of microporous carbons, comprising the steps of:

a) providing at least one microporous carbon at room temperature;

b) raising a temperature of said carbon at 10 degrees Celsius per minute from room temperature to approximately 850 degrees Celsius in a first atmosphere;

c) holding said temperature of said carbon at approximately 850 degrees Celsius for approximately 2 to 5 hours in a second atmosphere; and d) cooling said temperature of said carbon from approximately 850 degrees Celsius to room temperature in a third atmosphere.

2. A method according to claim 1, wherein said first atmosphere is selected from the group consisting of nitrogen, argon, and carbon dioxide.

3. A method according to claim 1, wherein said second atmosphere is selected from the group consisting of carbon dioxide, carbon dioxide with nitrogen, carbon dioxide with argon, and carbon dioxide with water vapor.

4. A method according to claim 1, wherein said third atmosphere is selected from the group consisting of nitrogen, argon, and carbon dioxide.

5. A method according to claim 2 or 4, wherein said second atmosphere is selected from the group consisting of carbon dioxide, carbon dioxide with nitrogen, carbon dioxide with argon, and carbon dioxide with water vapor.

6. A method according to claim 2 or 3, wherein said third atmosphere is selected from the group consisting of nitrogen, argon, and carbon dioxide.

* * * * *